US007440978B2

(12) United States Patent  
Chan et al.

(10) Patent No.: US 7,440,978 B2
(45) Date of Patent: Oct. 21, 2008

(54) METHOD AND SYSTEM FOR SYNCHRONIZING MULTIPLE USER REVISIONS, UPDATING OTHER STRATEGY MAPS IN THE DATABASES THAT ARE ASSOCIATED WITH THE BALANCED SCORECARD

(75) Inventors: Stella Y. Chan, Kirkland, WA (US); Corey Hulen, Sammamish, WA (US); Vincent Feng Yang, Beijing (CN); Noah H. Booth, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 394 days.

(21) Appl. No.: 11/035,754

(22) Filed: Jan. 14, 2005
(Under 37 CFR 1.47)

(65) Prior Publication Data

US 2006/0161596 A1    Jul. 20, 2006

(51) Int. Cl.
*G06F 17/30* (2006.01)
*G06F 17/00* (2006.01)

(52) U.S. Cl. .............................. 707/203; 707/1; 707/10; 707/201; 715/229

(58) Field of Classification Search ................. 707/1–2, 707/10, 100–102, 104.1, 200–203; 709/203, 709/210–215, 220–224; 715/229
See application file for complete search history.

(56) References Cited

U.S. PATENT DOCUMENTS

| 6,138,118 | A  | * | 10/2000 | Koppstein et al. ............... 707/8 |
| 6,182,121 | B1 | * | 1/2001  | Wlaschin ..................... 709/215 |
| 6,341,291 | B1 | * | 1/2002  | Bentley et al. ............... 707/203 |
| 6,343,299 | B1 | * | 1/2002  | Huang et al. ................. 707/203 |
| 6,598,059 | B1 | * | 7/2003  | Vasudevan et al. ........... 707/203 |
| 6,799,190 | B1 | * | 9/2004  | Boothby ....................... 707/204 |
| 6,901,417 | B2 | * | 5/2005  | Anglin et al. ................ 707/203 |
| 2002/0029214 | A1 | * | 3/2002 | Yianilos et al. ................. 707/7 |

(Continued)

FOREIGN PATENT DOCUMENTS

| EP | 1452975 | * | 9/2004 |
| WO | WO 01/90933 | * | 11/2001 |

OTHER PUBLICATIONS

Mong Xiong et al. "Mirror: a state-conscious concurrency control protocol for replicated real-time databases", Information systems 27 (2002) pp. 277-297.*

Jiwu Tao et al. "concurrency control and data replication strategies for large-scale and wide distributed databases", international conference on database systems for advanced applications, 2001 proceedings, Apr. 2001, pp. 352-359.*

(Continued)

*Primary Examiner*—Srirama Channavajjala
(74) *Attorney, Agent, or Firm*—Merchant & Gould

(57) ABSTRACT

A client may revise a balanced scorecard by adding, deleting and/or moving objects on a strategy map. Multiple clients may attempt to revise the strategy map simultaneously. Non-conflicting revisions are synchronized with the strategy map in a scorecard database. A conflicting revision may be generated when objects associated with one client's revisions cannot be reconciled with the objects associated with another client's revisions. Conflicting revisions may be resolved by giving one client's revisions priority over subsequent client revisions. Any identified zombie objects are removed from the strategy map before synchronization with the scorecard database. The revised strategy map is saved in the scorecard database. The revised objects are synchronized with the corresponding scorecard and any associated strategy maps in the scorecard database.

7 Claims, 4 Drawing Sheets

U.S. PATENT DOCUMENTS

2003/0172054 A1* 9/2003 Berkowitz et al. ............. 707/1
2003/0182450 A1* 9/2003 Ong et al. ................... 709/246
2005/0086384 A1* 4/2005 Ernst .......................... 709/248
2006/0106879 A1* 5/2006 Zondervan et al. .......... 707/200

* cited by examiner

METHOD AND SYSTEM FOR SYNCHRONIZING MULTIPLE USER REVISIONS, UPDATING OTHER STRATEGY MAPS IN THE DATABASES THAT ARE ASSOCIATED WITH THE BALANCED SCORECARD

BACKGROUND OF THE INVENTION

A balanced scorecard is a management system that enables organizations to clarify their vision and strategy, and translate them into action. The balanced scorecard provides feedback around both the internal business processes and external outcomes in order to continuously improve strategic performance and results. When fully deployed, the balanced scorecard transforms strategic planning from an academic exercise into the nerve center of an enterprise.

Balanced scorecards help companies prioritize performance from four perspectives and answer key business questions. The four perspectives are: the learning and growth perspective; the business process perspective; the customer perspective; and the financial perspective. The balanced scorecard may be used to develop metrics, collect data and analyze the data relative to each perspective.

A strategy map is a key component of the balanced scorecard. The strategy map is a visual representation of the various cause-and-effect relationships between a company's strategic goals, the internal processes to assist in achieving the goals, and the intangible assets required to execute those processes effectively. The strategy map provides the link between creating and executing a strategy. The strategy map shows the causal linkages between perspectives, objectives, key performance indicators, themes, and initiatives or a subset of these items. Software application programs have been developed that allow users to define scorecards and create corresponding strategy maps. For example, a scorecard may be defined by dragging and dropping shapes onto a page.

SUMMARY OF THE INVENTION

The present invention is directed to a method and system for synchronizing multiple user revisions to a balanced scorecard. Balanced scorecards and associated strategy maps are stored in a scorecard database. A balanced scorecard may be associated with multiple strategy maps. Each balanced scorecard includes scorecard objects that may identify perspectives, objectives, key performance indicators, themes, and initiatives. A user may select a scorecard or an associated strategy map to revise from a user interface on a client. The strategy map associated with the scorecard is retrieved from the scorecard database and displayed on the client. The client may revise the balanced scorecard by adding, deleting and/or moving objects on the strategy map.

Multiple clients may attempt to revise a strategy map simultaneously. The revisions may be synchronized into one scorecard file when the strategy map is saved in the scorecard database. Non-conflicting revisions are synchronized with the strategy map in the scorecard database. A conflicting revision may be generated when objects associated with one client's revisions cannot be reconciled with the objects associated with another client's revisions. Conflicting revisions may be resolved by giving one client's revisions priority over subsequent client revisions.

Any identified zombie objects are removed from the strategy map before synchronization with the scorecard database. A zombie object may be a scorecard object that has been removed from a previously synchronized strategy map but remains in a current view of the strategy map. Zombie objects are identified by comparing the objects in the associated strategy maps in the scorecard database to the objects in the current view of the strategy map on the client.

The revised strategy map is saved in the scorecard database. The revised objects are synchronized with the corresponding scorecard and any associated strategy maps in the scorecard database. When a strategy map associated with the scorecard is accessed from the scorecard database, the updated strategy map is retrieved and displayed with the synchronized revisions.

In one aspect of the invention, a strategy map is retrieved from a database. The strategy map corresponds to a balanced scorecard. Revisions to objects on the strategy map are received from a first client and a second client. Any conflicts between the objects revised by the first client and the objects revised by the second client are resolved. The revised strategy map is saved in the database. The revised objects are synchronized with the corresponding balanced scorecard in the database.

DETAILED DESCRIPTION OF THE PREFERRED EMBODIMENT

The present invention is directed to a method and system for synchronizing multiple user revisions to a balanced scorecard. A client may revise a balanced scorecard by adding, deleting and/or moving objects on a strategy map. Multiple clients may attempt to revise the strategy map simultaneously. Non-conflicting revisions are synchronized with the strategy map in a scorecard database. A conflicting revision may be generated when objects associated with one client's revisions cannot be reconciled with the objects associated with another client's revisions. Conflicting revisions may be resolved by giving one client's revisions priority over subsequent client revisions. Any identified zombie objects are removed from the strategy map before synchronization with the scorecard database. The revised strategy map is saved in the scorecard database. The revised objects are synchronized with the corresponding scorecard and any associated strategy maps in the scorecard database.

Illustrative Operating Environment

Figure 1:
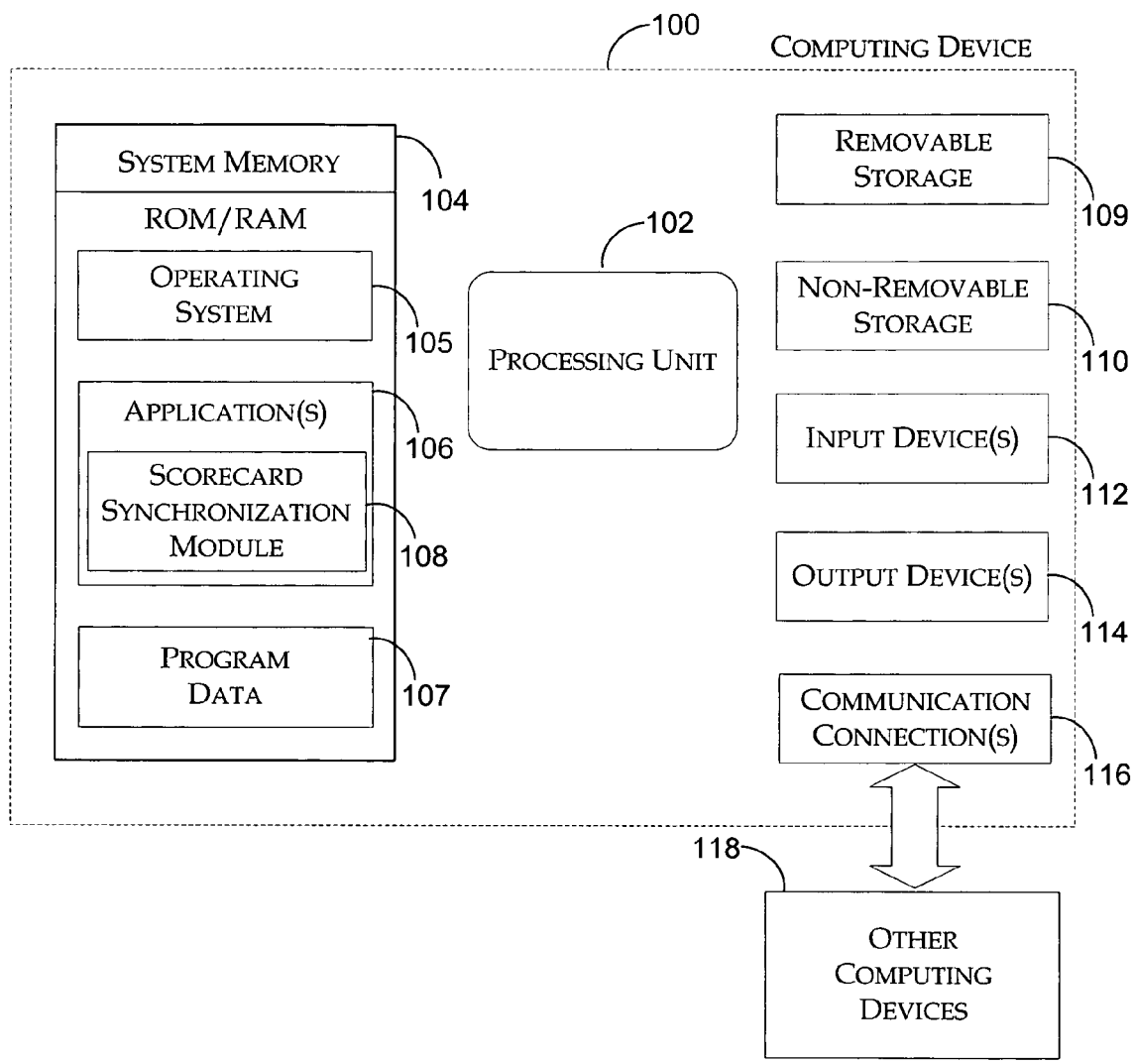
FIG. 1 illustrates a computing device that may be used according to an example embodiment of the present invention.

With reference to FIG. 1, one example system for implementing the invention includes a computing device, such as computing device 100. Computing device 100 may be configured as a client, a server, a mobile device, or any other computing device that interacts with data in a network based collaboration system. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. A scorecard synchronization module 108, which is described in detail below, is implemented within applications 106.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 also contains communication connections 116 that allow the device to communicate with other computing devices 118, such as over a network. Networks include local area networks and wide area networks, as well as other large scale networks including, but not limited to, intranets and extranets. Communication connection 116 is one example of communication media. Communication media may typically be embodied by computer readable instructions, data structures, and program modules By way of example, and not limitation, communication media includes wired media such as a wired network or direct-wired connection, and wireless media such as acoustic, RF, infrared and other wireless media.

Synchronizing Multiple User Revisions to a Balanced Scorecard

Figure 2:
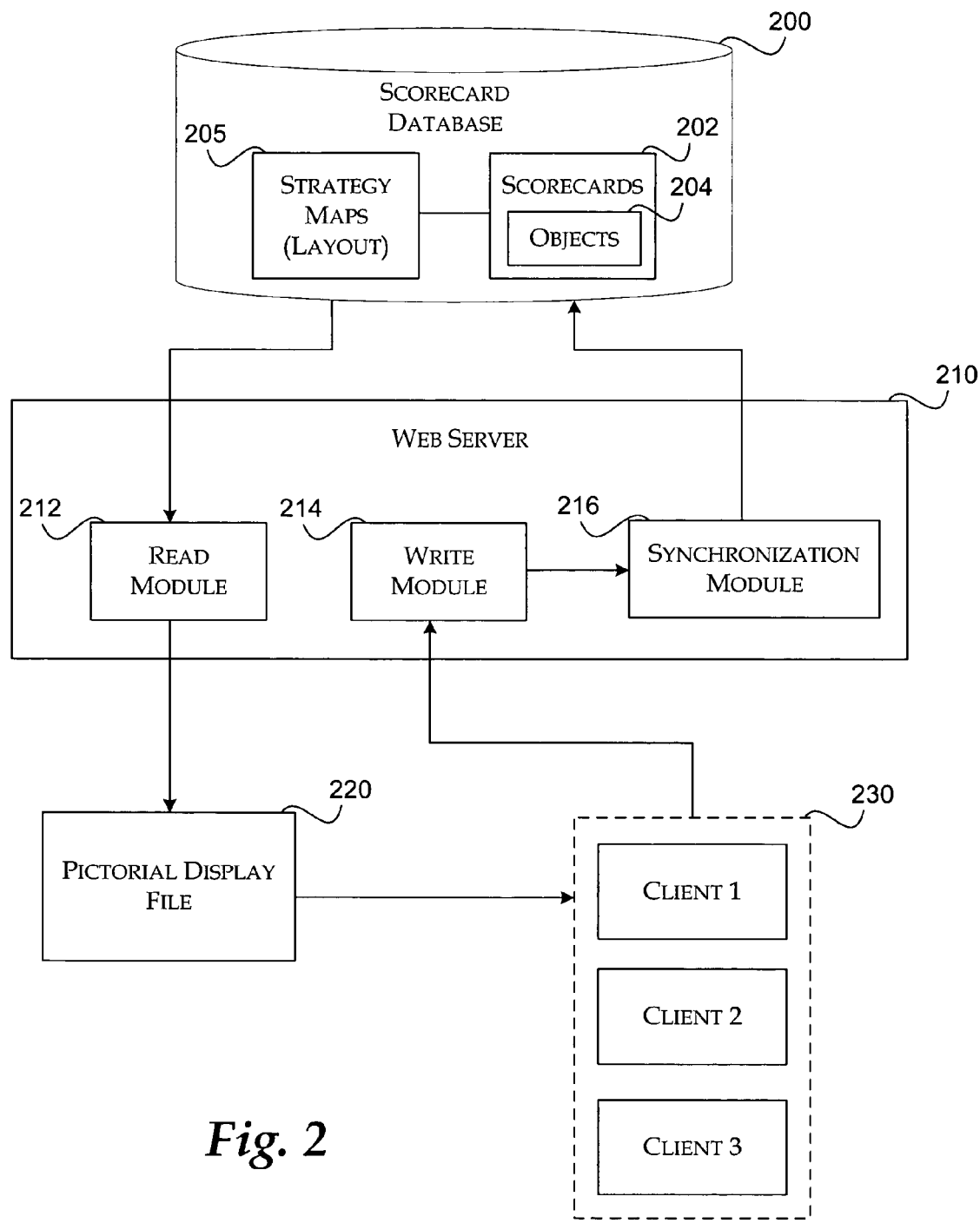
FIG. 2 illustrates a block diagram of a system for synchronizing multiple user revisions to a balanced scorecard, in accordance with the present invention.

FIG. 2 illustrates a block diagram of a system for synchronizing multiple user revisions to a balanced scorecard. The system includes scorecard database 200, web server 210, pictorial display file 220, and client bank 230. Web server 210 is coupled to scorecard database 200, pictorial display file 220, and client bank 230. Pictorial display file is also coupled to client bank 230. Scorecard database 200 includes scorecards 202 and corresponding strategy maps 205. A scorecard may be associated with multiple strategy maps. Thus, one scorecard may be displayed with different visual representations.

Each scorecard 202 includes objects 204. Each scorecard 202 also defines how objects 204 are related to each other. Examples of scorecard objects 204 include perspectives, objectives, key performance indicators, themes, and initiatives. Each strategy map 205 describes the visual arrangement of objects 204. Web server 210 includes read module 212, write module 214, and synchronization module 216. Client bank 230 includes clients that may access web server 210 (e.g., client 1, client 2 and client 3).

A user may select a strategy map from a user interface on a client in client bank 230 (e.g., client 1). The user interface calls web server 210. Read module 212 retrieves the selected strategy map and the corresponding scorecard information from scorecard database 200. Read module 212 submits the strategy map and the scorecard information to pictorial display file 220. Pictorial display file 220 displays the strategy map on client 1 according to the object layout. Pictorial display file 220 may be associated with a drawing application software program such as Visio® developed by the Microsoft Corporation of Redmond, Wash.

A client may revise a scorecard by adding, deleting and/or moving objects on the strategy map. The revised strategy map is forwarded to write module 214 in web server 210. Write module 214 saves the revised strategy map in scorecard database 200. The revisions are synchronized with any other strategy maps in the scorecard database that are associated with the scorecard. When a strategy map associated with the scorecard is accessed by another client, the updated strategy map is retrieved and displayed with the synchronized revisions.

Multiple clients may attempt to revise a strategy map simultaneously. A pessimistic lock may be implemented to block other users from revising the map (i.e., read only). However, the pessimistic lock inhibits the shared flow of information among users. Thus, an optimistic lock is implemented such that multiple users may simultaneously revise the same strategy map. The revisions may be synchronized into one scorecard file when the strategy map is saved to scorecard database 200.

In one embodiment, the most recently saved revisions to non-scorecard objects are implemented in the strategy map when two clients access the same strategy map simultaneously. For example, one client (e.g., client 1) may revise the strategy map by adding a non-scorecard object (e.g., an image). Client 1 then saves the strategy map. Another client (e.g., client 2) may revise and save the same strategy map without the non-scorecard object. The strategy map is stored in scorecard database 200 with the revisions from the most recent save. Thus, the strategy map is updated with the revisions from Client 2 (i.e., the strategy map is saved without the image).

In another embodiment, non-conflicting revisions are implemented in the strategy map when two clients simultaneously access the same strategy map. For example, one client (e.g., client 1) may revise the strategy map by adding a scorecard object (e.g., a first objective). Client 1 then saves the strategy map. Another client (e.g., client 2) may revise and save the same strategy map by adding another scorecard object (e.g., a second objective). No conflict exists between the client revisions because the first and second objectives are different scorecard objects. Thus, the strategy map is stored in scorecard database 200 with both the first and second objectives. The strategy map is presented with both the first and the second objectives the next time a client accesses the strategy map.

In yet another embodiment, conflicting revisions are resolved before implementation in the strategy map when two clients access the same strategy map simultaneously. One client (e.g., client 1) may revise the strategy map by deleting a scorecard object (e.g., a theme). Client 1 then saves the strategy map. Another client (e.g., client 2) may revise the same strategy map by adding a scorecard object (e.g., an objective) and associating the scorecard object with the theme. A conflict exists between the client revisions because client 1 deleted the theme and client 2 added an objective associated with the theme.

Synchronization module 216 applies rules to conflicting revisions such that the conflicts are resolved and the revisions may be synchronized into one strategy map. In one embodiment, conflicting revisions are resolved by giving one client's revisions priority over other client revisions. For example, if Client 1 accesses the strategy map first, then the revisions implemented by Client 1 have priority over any subsequent clients. In another example, if Client 1 saves the strategy map first, then the revisions implemented by Client 1 have priority over any subsequent clients.

Figure 3:
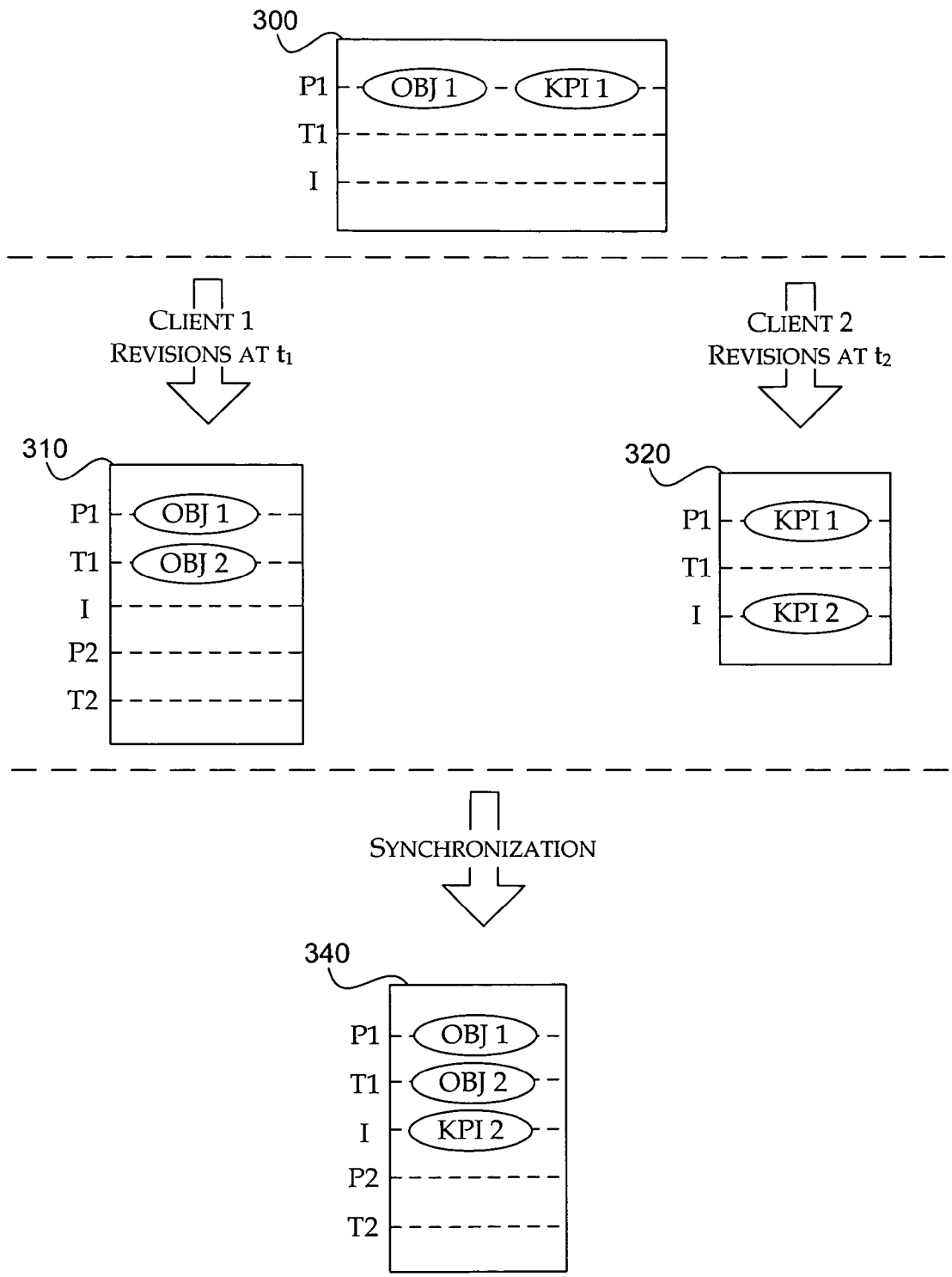
FIG. 3 illustrates different views of a strategy map that change in accordance with user revisions, in accordance with the present invention.

FIG. 3 illustrates four different views of a strategy map corresponding to one balanced scorecard. The views change in accordance with user revisions. First view 300 shows a strategy map that has been retrieved from a scorecard database before any revisions are made (e.g., at time $t_0$). First view 300 includes a first perspective (P1), a first theme (T1), and an initiative (I). The first perspective is associated with a first objective (OBJ 1) and a first key performance indicator (KPI 1). First view 300 is the strategy map retrieved from the scorecard database by two different clients: a first client and a second client.

Second view 310 shows the strategy map including the revisions made by the first client. The first client adds a second objective (OBJ 2) associated with the initiative (I), a second theme (T2) and a second perspective (P2) to the strategy map. The first client also deletes the first key performance indicator (KPI 1). The revisions made by the first client are synchronized before the revisions made by the second client because the first client saved the revisions before the second client (e.g., at time $t_1$). When first client saves the strategy map, other strategy maps associated with the scorecard are located in the scorecard database. The revisions made by the first client are then synchronized with the associated strategy maps.

Third view 320 shows the strategy map including the revisions made by the second client. The second client deletes the first object (OBJ 1) and adds a second key performance indicator (KPI 2) associated with the initiative (I). The second client then saves the revised strategy map at time $t_2$, where $t_2$ is later than $t_1$. The revisions are displayed to the second client on a user interface.

The synchronization module identifies a conflict between the second client revisions and the first client revisions which have already been synchronized with the scorecard database. Specifically, the second client deleted the first object (OBJ 1), and the first client retained the first object (OBJ 1) in the strategy map. The synchronization module scans the objects in the strategy maps in the scorecard database to identify any zombie objects in third view 320. A zombie object may be a scorecard object that has been removed from a previously synchronized strategy map but remains on a current view of the strategy map. For example, the first key performance indicator (KPI 1) is identified as a zombie object because client 1 deleted the first key performance indicator (KPI 1) before synchronizing the revisions. Any zombie objects are removed from the strategy map before the revisions made by the second client are synchronized with the scorecard database.

Fourth view 330 shows the strategy map including the synchronized revisions. The synchronized revisions include the revisions made by both the first and second clients with any identified zombie objects (e.g., KPI 1) removed. The synchronized revisions between the first and second clients are also synchronized with the scorecard database such that all other strategy maps associated with the scorecard may be updated.

Figure 4:
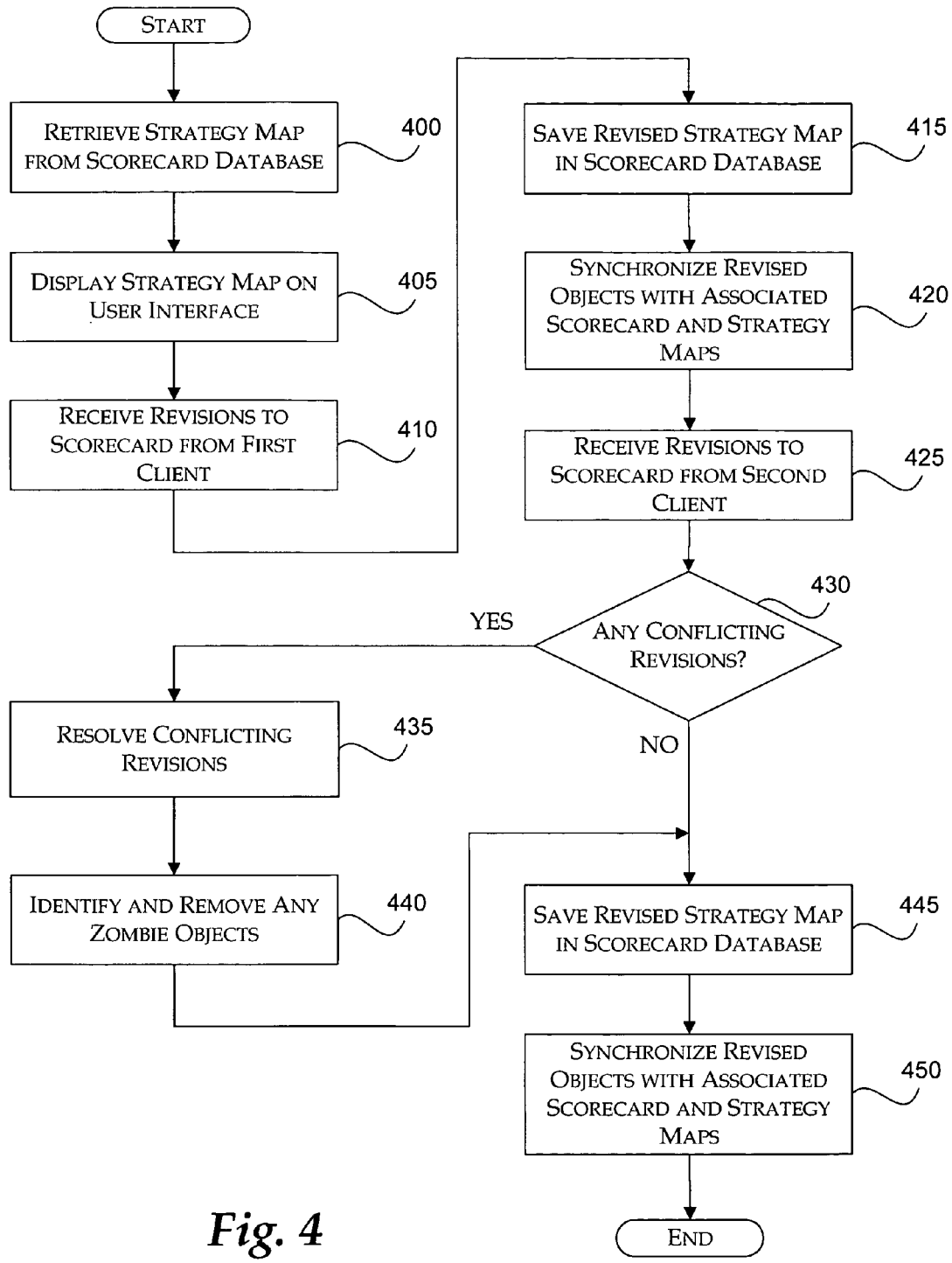
FIG. 4 illustrates an operational flow diagram illustrating a process for synchronizing multiple user revisions to a balanced scorecard, in accordance with the present invention.

FIG. 4 illustrates an operational flow diagram illustrating a process for synchronizing multiple user revisions to a balanced scorecard. The process begins at a start block where at least one strategy map is associated with a balanced scorecard. The strategy map includes scorecard objects.

Moving to block 400, a strategy map is retrieved from a scorecard database. A user may select the strategy map to retrieve from a user interface at a client. The user interface calls a web server. A read module associated with the web server retrieves the strategy map and submits the strategy map to a pictorial display file. Proceeding to block 405, the pictorial display file displays the strategy map on the user interface at the client.

Advancing to block 410, revisions made to the balanced scorecard by a first client are received. The first client may revise the balanced scorecard by adding, deleting and/or moving objects on the strategy map. Transitioning to block 415, the revised strategy map is saved in the scorecard database. Continuing to block 420, the revised objects are synchronized with the corresponding scorecard and any associated strategy maps in the scorecard database.

Moving to block 425, revisions made to the strategy map by a second client are received and displayed on a user interface associated with the second client. The second client may revise the scorecard by adding, deleting and/or moving objects on a strategy map associated with the same balanced scorecard that the first client revised.

Proceeding to decision block 430, a determination is made whether any conflicting revisions exist. A conflicting revision exists when the objects associated with the first client's revisions cannot be reconciled with the objects associated with the second client's revisions. For example, the first client may have deleted an object, and the second client moved the same object. If conflicting revisions exist, processing continues at block 435. If no conflicting revisions exist, processing continues at block 445.

Advancing to block 435, the conflicting revisions are resolved. The conflicting revisions may be resolved by giving one client's revisions priority over subsequent client revisions. For example, clients are prioritized according to the sequence of saving the strategy map in the scorecard database. The client who saves the revised strategy map first has priority over subsequently saved client revisions to the strategy map.

Transitioning to block 440, any zombie objects are identified and removed. A zombie object may be a scorecard object that has been removed from a previously synchronized strategy map but remains on a current view of the strategy map (i.e., the second client's view). The zombie objects are identified by comparing the objects in the strategy maps in the scorecard database to the objects in the current view of the strategy map on the second client.

Continuing to block 445, the revised strategy map is saved in the scorecard database. Moving to block 450, the revised objects are synchronized with the corresponding scorecard and any associated strategy maps in the scorecard database. Processing then terminates at an end block.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for synchronizing multiple user revisions to a balanced scorecard, comprising:

retrieving, on a web server, a strategy map from a database, wherein the strategy map corresponds to the balanced scorecard;

implementing an optimistic lock on the strategy map allowing a plurality of clients to edit the strategy map simultaneously;

receiving, on the web server, a first revised strategy map from a first client, wherein the first revised strategy map includes revisions to objects in the strategy map by the first client;

receiving, on the web server, a second revised strategy map from a second client, wherein the second revised strategy map includes revisions to objects in the strategy map by the second client;

resolving, on the web server, conflicts between objects of the first revised strategy map and objects of the second revised strategy map to generate a resolved strategy map, wherein resolving the conflicts comprises:

prioritizing the revisions associated with the first client over the revisions associated with the second client when the first revised strategy map associated with the first client is saved in the database before the second revised strategy map associated with the second client is saved in the database, identifying a zombie object in the second revised strategy map when a given object is removed from the first revised strategy map by the first client and the given object is further revised by the second client, and when the first revised strategy map associated with the first client is saved in the database before the second revised strategy map associated with the second client is saved in the database, and removing the identified zombie object from the second strategy map;

saving the resolved strategy map from the web server to the database;

synchronizing the objects of the resolved strategy map with the corresponding balanced scorecard in the database;

updating other strategy maps in the database that are associated with the balanced scorecard.

2. The computer-implemented method of claim 1, further comprising:

displaying the strategy map to the first client when the first client selects the strategy map; and displaying the strategy map to the second client when the second client selects the strategy map.

3. The computer-implemented method of claim 1, wherein an object is revised by one of: adding the object, deleting the object, and moving the object.

4. The computer-implemented method of claim 1, wherein saving the first revised strategy map further comprises saving the first revised strategy map with most recently saved revisions to the objects when the objects are not scorecard objects.

5. A system for synchronizing multiple user revisions to a balanced scorecard, comprising:

a database that comprises a strategy map that corresponds to the balanced scorecard;

a server coupled to the database, wherein the server is arranged to implement an optimistic lock on the strategy map allowing a plurality of clients to edit the strategy map simultaneously;

a first client coupled to the server, wherein the first client is arranged to:

retrieve the strategy map from the database, and
revise objects on the strategy map;

a second client coupled to the server, wherein the second client is arranged to:

retrieve the strategy map from the database, and
revise objects on the strategy map; and a synchronization module that is arranged to:

resolve conflicts between the objects of the revised strategy map revised by the first client and the objects of the revised strategy map revised by the second client wherein resolving the conflicts, the synchronization module is further arranged to:

prioritize the revisions associated with the first client over the revisions associated with the second client when the revised strategy map associated with the first client is saved in the database before the revised strategy map associated with the second client is saved in the database, identify a zombie object in the revised strategy map revised by the second client when a given object is removed from the first revised strategy map by the first client and the given object is further revised by the second client, and when the revised strategy map associated with the first client is saved in the database before the revised strategy map associated with the second client is saved in the database, and remove the identified zombie object from the strategy map revised by the second client, save a resolved strategy map in the database, synchronize the objects of the resolved strategy map with the corresponding balanced scorecard in the database;

update other strategy maps in the database that are associated with the balanced scorecard.

6. The system of claim 5, wherein the first client and the second client are arranged to revise objects by one of: adding the object, deleting the object, and moving the object.

7. A computer-readable storage medium having computer executable instructions for synchronizing multiple user revisions to a balanced scorecard, comprising:

retrieving, on a web server, a strategy map from a database, wherein the strategy map corresponds to the balanced scorecard;

implementing an optimistic lock on the strategy map allowing a plurality of clients to edit the strategy map simultaneously;

receiving, on the web server, a first revised strategy map from a first client, wherein the first revised strategy map includes revisions to objects in the strategy map by the first client;

receiving, on the web server, a second revised strategy map from a second client, wherein the second revised strategy map includes revisions to objects in the strategy map by the second client;

resolving, on the web server, conflicts between objects of the first revised strategy map and objects of the second revised strategy map to generate a resolved strategy map wherein resolving the conflicts comprises:

prioritizing the revisions associated with the first client over the revisions associated with the second client, identifying a zombie object in the second revised strategy map when a given object is removed from the first revised strategy map by the first client and the given object is further revised by the second client, and when the first revised strategy map associated with the first client is saved in the database before the second revised strategy map associated with the second client is saved in the database, and removing the identified zombie object from the strategy map;

saving the resolved strategy map from the web server to the database;

synchronizing the objects of the resolved strategy map with the corresponding balanced scorecard in the database; and updating other strategy maps in the database that are associated with the balanced scorecard.

* * * * *